UNITED STATES PATENT OFFICE 2,679,507

DISPOSAL OF SPENT REFINERY CAUSTIC WASTE

Karl L. Shull, Lima, Donald C. Roberson, Warrensville Heights, and Richard E. Knowlton, Warrensville Township, Cuyahoga County, Ohio, assignors to The Standard Oil Company, Cleveland, Ohio, a corporation of Ohio No Drawing. Application November 15, 1952, Serial No. 320,805

13 Claims. (Cl. 260—439)

This invention relates to a process for treating spent caustic petroleum refinery waste liquors to dispose satisfactorily of the waste.

In many petroleum refineries, gasoline blending stocks are treated with a strong caustic solution, which in some cases may contain free sulfur dissolved therein. During this treatment sulfur compounds such as corrosive mercaptans and cresylic acids are eliminated from the treated gasoline and accumulate in the caustic solution. "Cresylic acids" is a general term used in the petroleum industry, and is used herein, to refer to the entire range of phenolic and related phenolic compounds found in crude petroleum, or formed therein during refining. The residual caustic will contain considerable amounts of these cresylic compounds usually as the sodium salts thereof and, since the gasoline stock commonly contain hydrogen sulfide and other sulfur compounds, the caustic solution will also contain sulfide and other sulfur compounds after the treatment.

A typical spent caustic refinery waste liquor has the following analysis:

| | |
|---|---|
| Gravity | 8.8° Bé. (7% NaOH by wt.) |
| pH | 12.6 |
| $S^=$ | 1.91% by wt. as $Na_2S$ |
| $HS^-$ | 0.40% by wt. as NaHS |
| $S_2O_3^=$ | 0.93% by wt. as $Na_2S_2O_3$ |
| Cresylic (phenolic) compounds | 0.93% by wt. as phenol |
| Total sulfur | 3.41% by wt. as S |
| Sodium polysulfide ($Na_2S_{2.5}$) | 2.98% by wt. |

Disposal of waste caustic refinery liquor obtained by this treatment creates a serious problem because it is generally not possible to pump it into wells or run it into adjacent streams and waterways because of violation of local health and pollution laws. A stream is generally considered polluted if its phenolic content exceeds a maximum value set by law, if the combined biochemical oxidation demand (B. O. D.) and chemical oxidation demand (C. O. D.) exceed the available dissolved oxygen in the stream, and if the odor is bad. Because the spent caustic leaves the refinery at temperatures of the order of 115° F., and because of the heat of dilution of the caustic with water, streams into which it is led are warmed considerably and this reduces the normal content of absorbed oxygen. If the temperature of the stream is, for example, 80° F., it contains about 7 parts of oxygen per million parts of water at equilibrium. The combined B. O. D. (bacterial activity is high at this temperature) and C. O. D. (due to sulfur compounds in the caustic) thereof far exceed this available oxygen value, so that the stream acquires an odor which is exceedingly objectionable. Thus the sulfides and cresylic acids in the spent caustic become a disposal problem and represent, in the case of the cresylic compounds at least, a substance to eliminate from the disposal wastes, and to recover for other uses where the recovery can be accomplished economically.

In accordance with our invention, we have discovered that by the treatment of the spent refinery caustic with an acid to a suitable adjustment of the pH and with a ferrous salt, the cresylic acids may be precipitated. The precipitate can be separated from the liquid by settling, filtering, centrifuging or by other conventional separation methods. By further adjustment of the pH and the further addition of ferrous iron the sulfur compounds are precipitated and can similarly be separated. If it is preferred, and if the liquid at the optimum pH for phenol precipitation contains more phenolic compounds than it is desired to discharge, the liquid can be extracted with a hydrocarbon to remove the excess phenolic compounds, or further acidified to recover excess phenolic compounds as an oily layer.

In practicing the invention, a ferrous salt, preferably dissolved in water, such as ferrous sulfate, chloride, acetate, etc., is added to the spent refinery caustic. The sulfate is the cheapest and is preferred. The pH is adjusted to 12 or above by adding a base such as caustic or a mineral acid such as sulfuric, hydrochloric, etc. A precipitate is obtained which is believed to be largely iron phenolates, and which are selectively precipitated at a pH of 12 or above. The precipitate may then be separated in the manner described heretofore.

The pH is then adjusted within the range of 8 to 11 by the addition of a mineral acid, such as sulfuric, hydrochloric, etc., and upon the addition of a further quantity of a ferrous salt, if necessary, the sulfur compounds are precipitated. This precipitate may be separated in the manner described.

If the amount of phenolic compounds remaining in the residual liquor is too high, it can be further reduced by either or both of the following methods. (1) The residual liquor is acidified to a pH of about 5 to 7.5 and extracted with the hydrocarbon solvent, such as petroleum naphtha. The phenolic compounds can be separated from the solvent by distillation. (2) The solution can be further acidified to a pH of 3 up to less than 5, whereupon any remaining phenols separate as an oily layer and can be skimmed off. If further phenols are to be removed they can be extracted as in (1) above since the extraction can be carried out at the lower pH. The resulting solution with the phenolic content reduced to meet any particular demand, and with adjustment of pH if necessary, may then be directed through the usual disposal channels.

The steel industry likewise is faced with a serious waste liquor disposal problem. The removal of oxide scale from certain steel products is an essential operation prior to further processing. Usually this is accomplished by immersing the steel in a bath of dilute sulfuric acid for a relatively brief period. The acid dissolves the scale together with some of the base metal, resulting in an accumulation of ferrous sulfate in the bath. This treatment is called "pickling" and the liquor which results is called "pickle liquor." Eventually the pickle liquor becomes ineffective and must be disposed of. Its disposal has been a problem for many years.

A variety of acids (sulfuric, hydrochloric, nitric, hydrofluric and phosphoric, individually and in combination) is employed, depending on the kind of product being treated, but sulfuric acid accounts for more than 90% of the tonnage pickled, and therefore disposal of sulfate pickle liquors presents the most serious problem. Spent sulfate pickle liquor normally has a composition ranging from 0.57 to 7% free sulfuric acid and from 15 to 30% ferrous sulfate when a batch pickler is used, while waste pickle liquor from a continuous pickler has from 2 to 7% free sulfuric acid and from 14 to 16% ferrous sulfate. The term "pickle liquor" as used in the specification and claims is intended to refer to sulfate pickle liquor having the aforementioned compositions, whether produced by a batch or a continuous pickling process of removing the oxide scale from steel.

The development of practical processes for the recovery of useful products from waste pickle liquor has engaged the attention of a large number of workers, and many processes have been proposed. However, few of these processes have ever been operated successfully.

The easiest method is to recover ferrous sulfate and free sulfuric acid from the waste liquor. However, the demand for copperas in this country can be supplied by less than 4% of the pickle liquor produced by the steel industry alone. Moreover, copperas cannot be shipped very far economically because 45% of its weight is water of crystallization. Both ferrous sulfate and sulfuric acid are low cost chemicals so that their recovery must be accomplished by the simplest possible process and equipment. However, hot dilute sulfuric acid is corrosive and it can be processed only at high equipment and maintenance costs. Even when recovered it is not entirely satisfactory for reuse in pickling because of the tendency for impurities to accumulate. Where production of more valuable derivatives is investigated, similar difficulties are met.

Because of the apparent remoteness of any possibility that a feasible recovery process might be developed, it has become customary to discharge the spent pickle liquor into tide water, streams or lakes, either directly or through sanitary sewers. However, complaints against the pollution resulting therefrom has led the industry to adopt other methods. The expedients most frequently employed have been lagooning the liquor to permit it to disappear through solar evaporation and seepage into the earth or into slag dumps, or treating the liquor with lime. Neutralization of the liquor with lime is costly, and the by-product thereof is calcium sulfate which has little or no market value.

In accordance with an especially practical embodiment of our invention, the waste pickle liquor can be used as the source for at least a part of the ferrous salt and the acid for neutralizing and treating the refinery wastes. This embodiment of our invention represents a particularly economical and satisfactory method for the joint disposal of two waste products, both of which present difficult disposal problems.

Whether or not the spent pickle liquor can be used as the sole source of the ferrous salt will depend upon the relative amounts of ferrous sulfate and acid in the spent pickle liquor, the amounts of phenolic compounds and sulfur compounds in the spent caustic refinery waste and the separations to be accomplished in each stage. In the first step of the process very little acid is required since the pH is kept relatively high, i. e., above 12. If the amount of ferrous sulfate from the pickle liquor is not adequate for this purpose it can be replaced or supplemented from an external source. In the second step in which the pH is reduced to a value within the range of 8 to 11, the spent pickle liquor may be used largely for this purpose since the addition of the amount of spent pickle liquor to provide ferrous sulfate to precipitate the sulfur compounds will generally not take the pH of the solution outside a desirable value in the range of 8 to 11. If it does, the adjustments may be made by separately adding a ferrous salt or an acid of an external source.

If the residual liquor is to be extracted with a hydrocarbon solvent, the pickle liquor may be used to reduce the pH for this extraction by means of spent pickle liquor provided the resulting pH is not below the point at which the iron will be precipitated as the hydroxide. Before extracting the phenolic compounds or separating them by acidification, it is desirable to filter the residual liquor at a pH at which all of the iron can be separated, and to further acidify, if desirable, with a mineral acid which will not increase the iron content.

By the practice of the present invention it is possible in the first step to separate selectively phenolic compounds as iron salts. Phenolic compounds may be recovered from the precipitate after filtration by acidification, for example. Since these phenol compounds are not coprecipitated with sulfur compounds, they are economically valuable and may be recovered and reused.

The following examples illustrate application of the invention to typical caustic refinery waste liquors. The reactions described are practically instantaneous and were carried out at ambient temperatures.

*Example 1*

To 100 parts by weight of a caustic refinery waste having the composition indicated heretofore was added gradually about 1.3 parts of copperas ($Fe_2SO_4 \cdot 7H_2O$) dissolved in water. The pH was about 12.1. The precipitate consisted of iron compounds including iron phenolates which were separated by filtration. The pH of the filtrate was then adjusted to 9.0 by addition of sulfuric acid and more ferrous sulfate was added to precipitate all of the sulfur compounds as insoluble iron compounds. The precipitate was separated by filtration.

*Example 2*

To a caustic refinery waste having the composition indicated heretofore was added ferrous sulfate in amounts until the addition of ferrous sulfate did not produce an additional precipitate. The precipitate consisted of iron compounds including iron phenolates which were separated by filtration, as in Example 1. To the filtrate was added sufficient spent pickle liquor containing 29.3% ferrous sulfate, 3.5% sulfuric acid to precipitate all of the sulfur compounds. The amount to accomplish this purpose resulted in a pH of about 8.5. The precipitate was separated by filtration.

*Example 3*

Examples 1 and 2 were repeated except that an amount of spent pickle liquor was added in the first step until the pH of the spent caustic was reduced from 12.6 to 12.1. An additional small amount of ferrous sulfate was added to assure the precipitation of all of the phenolic compounds.

*Example 4*

The processes of Examples 1 and 2 were repeated following which the filtrate from the second filtration was neutralized with sulfuric acid to a pH of about 7 and additional phenolic compounds were extracted with petroleum naphtha. The phenolic compounds and the petroleum naphtha were separated by distillation.

*Example 5*

The processes of Examples 1 and 2 were repeated following which the filtrate from the second filtration was acidified with sulfuric acid to a pH of about 4. An oily layer of cresylic acid separated at the top and was skimmed off.

*Example 6*

The process of Example 4 was repeated except that before discharging the liquor to the sewer it was extracted with petroleum naphtha and the extracted phenolic compounds were recovered from the petroleum naphtha by distillation.

It will be apparent that the process of the invention accomplishes the mutual disposal of two spent waste liquors at very slight cost, the only additional materials required being mineral acids and petroleum naphtha, and even the use of these being optional. As a by-product of rendering these liquors innocuous, cresylic acid mixtures are recovered. These may be treated to separate phenols and cresols therefrom, if desired. The treated waste liquors are substantially free of sulfur compounds and cresylic acids, and therefore disposable in sewers in the ordinary way, or even in streams and waterways without danger of polluting them.

Numerous changes and modifications may be made in the process without departing from the spirit thereof, as will be apparent to those skilled in the art. For example, the process may be carried out as either a batch or a continuous method.

We claim:

1. A process of treating spent caustic refinery waste liquor comprising sulfur compounds and cresylic acids, which comprises adding thereto a ferrous salt with an adjustment of the pH of the liquor to a value not less than 12 to precipitate at least a part of the cresylic acids, separating the precipitate, adjusting the pH of the remaining liquor to a pH in the range of 8 to 11 and adding a ferrous salt to precipitate at least a part of the sulfur compounds, and separating the resulting precipitate from the residual liquor.

2. The process of claim 1 in which at least a part of the ferrous salt for the first precipitating step is obtained from spent pickle liquor.

3. The process of claim 1 in which at least a part of the ferrous salt for the second precipitating step is obtained from spent pickle liquor.

4. The process of claim 1 in which at least a part of the ferrous salt for the first and second precipitating steps is obtained from spent pickle liquor.

5. The process of claim 1 in which the precipitate from the first step is acidified to separate cresylic acids from the precipitate.

6. The process of claim 1 in which the residual liquor from the second precipitating step is extracted with a petroleum hydrocarbon at a pH of about 5 to 7.5.

7. The process of claim 1 in which the residual liquor from the second precipitating step is acidified to a pH of 3 to less than 5 and the resulting water-immiscible cresylic acids are separated therefrom.

8. The process in which the residual liquor of claim 5 is extracted with a petroleum hydrocarbon.

9. A process of treating spent caustic refinery waste liquor comprising sulfur compounds and cresylic acids, which comprises adding thereto a ferrous salt with an adjustment of the pH of the liquor to a value not less than 12 to precipitate at least a part of the cresylic acids, separating the precipitate, adjusting the pH of the residual liquor to a pH in the range of 8 to 11 and adding a ferrous salt at least a part of which is in the form of spent pickle liquor to precipitate at least a part of the sulfur compounds, and separating the resulting precipitate from the residual liquor.

10. The process of claim 9 in which the precipitate from the first step is acidified to separate cresylic acids from the precipitate.

11. The process of claim 9 in which the residual liquor from the second precipitating step is extracted with a petroleum hydrocarbon at a pH of 5 to 7.5.

12. The process of claim 9 in which the residual liquor from the second precipitating step is acidified to a pH of 3 to 5 and the resulting water-immiscible cresylic acids are separated therefrom.

13. The process in which the residual liquor from the process of claim 12 is extracted with a petroleum hydrocarbon.

No references cited.